United States Patent
Bernard et al.

US006335120B1

(10) Patent No.: US 6,335,120 B1
(45) Date of Patent: Jan. 1, 2002

(54) NON-SINTERED NICKEL ELECTRODE

(75) Inventors: Patrick Bernard, Massy; Corinne Dennig, Asnieres sur Seine; Jean-Michel Cocciantelli; José Alcorta, both of Bordeaux; Isabelle Coco, Dax, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/229,743

(22) Filed: Jan. 14, 1999

(30) Foreign Application Priority Data

Jan. 15, 1998 (FR) .............................. 98 00349

(51) Int. Cl.⁷ .............................. H01M 4/32; H01M 4/62
(52) U.S. Cl. .................... 429/223; 429/217; 429/215; 429/213
(58) Field of Search .................. 429/223, 213, 429/215, 217

(56) References Cited

U.S. PATENT DOCUMENTS

| | | | |
|---|---|---|---|
| 4,326,914 A | * | 4/1982 | Hohne .................. 428/444 |
| 4,578,327 A | * | 3/1986 | Saito et al. ............ 429/212 |
| 4,808,497 A | * | 2/1989 | Blomgren et al. | |
| 5,788,943 A | * | 8/1998 | Aladjov .................... 429/223 |
| 5,795,679 A | * | 8/1998 | Kawakami et al. ...... 429/218.1 |
| 5,902,699 A | * | 5/1999 | Cocciantelli et al. ....... 429/217 |

FOREIGN PATENT DOCUMENTS

| | | |
|---|---|---|
| EP | 0 726 607 A1 | 8/1996 |
| EP | 0 806 802 A1 | 11/1997 |
| JP | 59-189560 | * 10/1984 |

OTHER PUBLICATIONS

Patent Abstracts of Japan, vol. 013, No. 268 (E–775) Jun. 20, 1989 corresponding to JP 01 059767 A (Hitachi Chem Co Ltd) Mar. 7, 1989.

* cited by examiner

Primary Examiner—Carol Chaney
Assistant Examiner—Tracy Dove
(74) Attorney, Agent, or Firm—Sughrue Mion, PLLC

(57) ABSTRACT

A non-sintered nickel electrode contains a conductive support and a paste comprising an electrochemically active material containing nickel hydroxide and a binder which is a mixture of an elastomer and a crystalline polymer. The proportion of the elastomer is in the range 25% to 60% by weight of the binder and the proportion of the crystalline polymer is in the range 40% to 75% by weight of the binder.

21 Claims, No Drawings

NON-SINTERED NICKEL ELECTRODE

BACKGROUND OF THE INVENTION

1. Field of the Invention

The present invention relates to a non-sintered nickel electrode such as that which is used in secondary cells containing an alkaline electrolyte, such as, for example, nickel-cadmium, nickel-iron, nickel-hydrogen and nickel-hydridable-metal rechargeable batteries, and to the cell containing it.

2. Description of the Prior Art

Several types of electrode exist, in particular sintered electrodes and non-sintered nickel electrodes, also referred to as impasted or plasticized electrodes. The electrodes most widely used nowadays are of the non-sintered type. Compared with other electrodes, a non-sintered electrode contains a larger amount of active material, its specific capacity is thus increased and its manufacturing cost is lower.

A non-sintered electrode is composed of a support which serves as a current collector, which is coated with a paste containing the active material and a binder, to which is usually added a conductive material. It is usually made by depositing the paste in a porous three-dimensional conductive support such as a felt or a foam made of metal or carbon.

European Patent Application EP-0 726 607 mentions an electrode comprising a porous support coated with a paste. The support is not a critical component, and can be two-dimensional or three-dimensional. The paste contains the active material, a conductive agent, a fluorinated resin and a thickener. The fluorinated resin used as binder can be a mixture of fluorinated resin and of thermoplastic resin. This document does not mention the electrochemical functioning of the electrode.

For cost reasons, the trend is nowadays toward use of a two-dimensional conductive supports.

Japanese Patent Application JP-3 165 469 proposes a nickel electrode comprising a two-dimensional porous conductive support coated with a paste containing nickel hydroxide, a conductive material and a thermoplastic binder, such as a butylene/ethylene/styrene copolymer. In order to ensure binding of the active material to the support, a separator is hot-pressed onto each face of the electrode.

European Patent Application EP-0 750 358 describes a non-sintered nickel electrode whose support is a corrugated metal sheet on which teeth have been formed in order to catch in a layer with microrugosity. A paste comprising carboxymethylcellulose (CMC) and a styrene/butadiene copolymer (SBR) is deposited on this layer.

The known binders used to make an electrode containing a three-dimensional support prove to be unsuitable for a two-dimensional support. In the two previous examples, it was necessary to use a means other than the binder to give the electrode its mechanical strength.

The object of the present invention is to propose a non-sintered nickel electrode containing a two-dimensional, or flat, support, whose mechanical strength and chemical resistance to electrochemical oxidation are enhanced.

SUMMARY OF THE INVENTION

The subject of the present invention is a non-sintered nickel electrode containing a two-dimensional conductive support and a paste comprising an electrochemically active material containing nickel hydroxide and a binder which is a mixture of an elastomer and a crystalline polymer, wherein the proportion of the elastomer is in the range 25% to 60% by weight of the binder and the proportion of the crystalline polymer is in the range 40% to 75% by weight of the binder.

The binder is an essential component of the electrode since its role is both mechanical and electrochemical.

The binder has the function of ensuring cohesion of the grains of active material with each other and with the electrode support, before assembly of the rechargeable battery and during its functioning. On the one hand, the binder must be of sufficient chemical stability. Firstly, it must be chemically inert with respect to the components of the cell; next, it must be capable of withstanding electrochemical oxidation under the cycling conditions to which the electrode is subjected. However, certain binders suffer degradation of their adhesive properties during cycling. On the other hand, the binder must be capable of being deformed in order to match the variations in size of the electrode during cycling throughout its life.

The function of the binder is also to maintain the electrical contact between the grains of active material and to promote the ionic exchanges with the electrolyte. On the one hand, the electrochemically active area of an electrode depends on the area wetted by the electrolyte. To promote the wetability of the electrode by the aqueous electrolyte, the binder should have a hydrophilic nature. If the electrode is not sufficiently wetted, the active area is decreased, which leads to an increase in the local current density and a lower charged capacity. On the other hand, the area accessible to the electrolyte depends on the manner in which the grains of active material are coated and bound by the polymer. The polymer film should have discontinuities to allow the electron exchanges.

An elastomer is a polymer which has elastic properties. It is defined as a polymer which has a viscoelastic state at ambient temperature Ta, which means that its glass transition temperature Tg is below ambient temperature Ta. The use of an elastomer as a binder makes it possible to obtain a nickel electrode with suitable mechanical properties. However, when used alone, it forms a film which coats the grains of active material and greatly reduces the electrical conductivity of the electrode.

The elastomer is preferably chosen from a copolymer of styrene, of ethylene, of butylene and of styrene (SEBS), a terpolymer of styrene, of butadiene and of vinylpyridine (SBVR) and a copolymer of styrene and of butadiene (SBR). The copolymer of styrene and of butadiene preferably contains from 25 to 35% by weight of styrene.

In contrast with other elastomers, a crosslinkable elastomer will instead form lumps of polymer distributed on and around the grains of active material. Crosslinking makes it possible to limit the creep of the polymer. Advantageously, the elastomer is a crosslinkable carboxylated copolymer of styrene and of butadiene (carboxylated SBR), i.e. an SBR bearing —COOH groups which allow its crosslinking. A crystalline polymer is characterized by the fact that it has a melting point.

This polymer is solid at ambient temperature. A crystalline polymer does not form a film: when used alone, it does not have sufficient cohesion to keep the active material on the support.

Preferably, the crystalline polymer is chosen from a fluorinated polymer and a polyolefin, such as polyethylene (PE).

If the crystalline polymer is a fluorinated polymer, it is preferably chosen from a fluorinated copolymer of ethylene and of propylene (FEP), polytetrafluoroethylene (PTFE) and polyhexafluoropropylene (PHFP).

From a mechanical point of view, the greater the proportion of elastomer, the better the cohesion of the electrode. The addition of a crystalline polymer has the function of breaking the continuity of the elastomer film, and thus of preserving the electrochemical performance of the electrode. The binder according to the invention should contain at least 25% by weight of elastomer. Below this proportion, the mechanical strength of the electrode will no longer be sufficient, in particular in the case of a coiled electrode.

To ensure the cohesion and electrochemical functioning of the electrode throughout its period of use, the proportion of the crosslinkable elastomer should be in the range 25% to 60% by weight of the binder, and the proportion of the crystalline polymer should be in the range 40% to 70% by weight of the binder.

According to a preferred embodiment, the binder is composed of 40% to 60% by weight of the elastomer and of 40% to 60% by weight of the crystalline polymer.

If a high content of binder is introduced into the paste, the electrical conductivity of the electrode is decreased, which produces a lowering of the energy density of the power source. It is thus essential to minimize the inevitable loss of capacity which results from producing the electrode, by striving to introduce the minimum possible amount of binder required, but a sufficient amount to ensure this cohesion. Below 0.7% by weight of binder, the mechanical strength of the electrode is no longer satisfactory. The proportion of binder according to the invention is preferably in the range 0.7% to 3% by weight of the paste.

An advantage of the present invention is that only a small mass of binder is needed to ensure the cohesion of the electrodes, while at the same time conserving their excellent flexibility, in particular in the case of a coiled electrode.

It is clearly understood that the term "electrochemically active material containing nickel hydroxide" used in the present patent application can mean a nickel hydroxide, a hydroxide containing mainly nickel, but also a nickel hydroxide containing at least one syncrystallized hydroxide of an element chosen from zinc, cadmium and magnesium and at least one syncrystallized hydroxide of an element chosen from cobalt, manganese, aluminum, yttrium, calcium, strontium, zirconium and copper. A syncrystallized hydroxide contained in the nickel hydroxide is a hydroxide which forms a solid solution with the nickel hydroxide, i.e. one which occupies, in continuously variable proportion, the atomic sites defined by the crystal lattice of the nickel hydroxide.

Preferably, this hydroxide has a spheroidal shape and has a particle size of in the range 7 $\mu$m to 20 $\mu$m.

The active material can be coated with a coating based on cobalt oxide or hydroxide optionally containing other elements such as nickel, zinc, aluminum and/or manganese, or alternatively with a porous metal coating, for example of nickel.

Nickel hydroxide is a poorly conductive compound which requires the addition of a conductive material to give good electrical percolation. The paste also comprises a conductive material chosen from conductive particles, conductive fibers and mixtures thereof.

The term "particle" is intended to mean a very small amount of material, the three spatial dimensions of which are of the same order of magnitude, defined by an average dimension $D_1$. The shape of the conductive particles can be spherical, quasi-spherical or completely irregular. Preferably, the conductive particles have an average dimension $D_1$ less than or equal to D/20, D being the average diameter of the grains of the active material, and more preferably $D_1$ is less than or equal to D/100.

The conductive particles are chosen from carbon particles, particles of metal, for example such as nickel, and powder of a transition metal compound such as Co, CoO or $Co(OH)_2$.

The term "fiber" is intended to refer to a very small amount of material, one spatial dimension of which is large compared with the other two, defined by an average transverse dimension $D_2$ and an average length $L_2$. Preferably, the conductive fibers have an average transverse dimension $D_2$ less than or equal to D and an average length $L_2$ greater than or equal to 25 times the value of $D_2$, and preferably $L_2$ is greater than or equal to 75 times $D_2$. The conductive fibers are chosen from carbon fibers, metal fibers or fibers coated with metal, for example such as nickel.

According to a preferred embodiment, $D_1$ will be chosen to be less than or equal to 0.1 $\mu$m and $D_2$ less than or equal to 2 $\mu$m.

Preferably, the proportion of the conductive material in the paste is in the range 3% to 15% by weight of the active material. Above this value, the specific capacity of the electrode decreases on account of the large proportion of conductive material in the electrode.

The paste can also contain at least one compound chosen from zinc compounds, such as ZnO or $Zn(OH)_2$, yttrium compounds such as $Y_2O_3$ or $Y(OH)_3$ and calcium compounds such as CaO, $Ca(OH)_2$ or $CaF_2$. This compound is usually added in powder form.

In order to make the electrode easier to produce, the paste also comprises a thickener which is a cellulose compound chosen from carboxymethylcellulose (CMC), hydroxypropylmethylcellulose (HPMC), hydroxypropylcellulose (HPC) and hydroxyethylcellulose (HEC).

The term "two-dimensional support" is intended to refer to a flat support on which a layer of paste is deposited. The adhesive properties of the binder are thus essential for keeping the layer on the support, in particular in the case of coiling of the electrode. The two-dimensional conductive support can be a solid or perforated strip, an expanded metal, a mesh or a fabric. It is, for example, a nickeled steel strip in the range $3 \times 10^{-3}$ mm to $10^{-2}$ mm in thickness, with a mass per unit area of in the range 3 g/dm$^2$ to 6 g/dm$^2$ and an aperture content of in the range 0% to 80%, the diameter of the holes being in the range 0.1 mm to 3 mm. According to one variant, the support can also be a foam with a very low mass per unit area, of 2 g/dm$^2$ to 7 g/dm$^2$, containing the above strip at its center.

An advantage of the present invention is the convenience of manufacture of the electrodes, since most of the polymers can be used in the form of an aqueous emulsion; the manufacture of the electrodes by wet-route impasting followed by drying is facilitated (stable paste with good Theological properties).

DETAILED DESCRIPTION OF THE PREFERRED EMBODIMENT

The invention will be understood more clearly, and other advantages and particular features will emerge on reading the description which follows, given by way of nonlimiting illustration.

On the one hand, the tests were carried out on the following binders of the prior art: a fluorinated ethylene/propylene copolymer (FEP), polytetrafluoroethylene (PTFE), polyethylene (PE), polyamide (PA), a styrene/ ethylene/butylene/styrene copolymer (SEBS), a styrene/butadiene/vinylpyridine terpolymer (SBVR) with a weight composition of 15/70.7/14.3 and a carboxylated styrene/butadiene copolymer (SBR) containing 30% styrene. On the other hand, the same tests were carried out on binders according to the present invention, consisting of a mixture of SEBS, on the one hand, or of carboxylated SBR, on the other hand, with polytetrafluoroethylene (PTFE), or with polyethylene (PE) or alternatively with a fluorinated ethylene/propylene copolymer (FEP).

In a first stage, the intrinsic mechanical properties of the various binders were compared.

These properties were measured on dumbbell-shaped test pieces, of dimensions 40 mm×4 mm×1 mm, made with the binders mentioned above. Table I below shows the values of the modulus of elasticity E and the tensile strength K expressed in megapascals (MPa), as well as the % elongation at break L.

TABLE I

| Binders | E | K | L |
| --- | --- | --- | --- |
| PA | 16 | 1.72 | 10 |
| SEBS | 6 | — | — |
| SBVR | 0.5 | 0.3 | 219 |
| Carboxylated SBR | 0.25 | 0.7 | 630 |
| 40% by weight of carboxylated SBR + 60% by weight of PTFE | 3.1 | 0.6 | 400 |
| 50% by weight of carboxylated SBR + 50% by weight of PTFE | 1.7 | 0.5 | 580 |
| 40% by weight of carboxylated SBR + 60% by weight of PE | 7.3 | 2.2 | 130 |
| 50% by weight of carboxylated SBR + 50% by weight of PE | 5.4 | 0.9 | 270 |
| 40% by weight of carboxylated SBR + 60% by weight of FEP | 9.5 | 2 | 590 |
| 50% by weight of carboxylated SBR + 50% by weight of FEP | 7.1 | 1.65 | 735 |

In the case of the FEP, PTFE and PE polymers used alone, the cohesion of the electrode proved to be insufficient for it to be possible to carry out these measurements.

The mixtures according to the invention comprising carboxylated SBR and a crystalline polymer achieved a good compromise. They withstood large deformations (large elongation at break), which resulted in great flexibility of the electrodes.

In a second stage, the chemical stability of the polymer as an electrode binder under its working condition was evaluated. Electrodes were made in the following way using the binders mentioned above.

A paste in an aqueous phase was prepared comprising a mixture of 97.9% by weight of active material (nickel hydroxide), 2% by weight of the chosen binder and 0.1% by weight of a cellulose thickener (HPMC), to which water was added in a proportion of 27% by weight of the mixture. The binders were introduced into the paste in the form of an aqueous dispersion, with the exception of the SEBS which was predissolved in a minimum amount of toluene.

The paste was coated onto a perforated nickel strip with a thickness of 0.1 mm, a surface mass of 4.6 g/dm$^2$ and an aperture content (perforated area/total area) of 42%. The assembly was dried at a temperature of about 130° C. in order to obtain an electrode.

The flexibility S of these various electrodes was observed. Next, an attempt was made to coil them and their mechanical strength R was observed. The qualitative results obtained are collated in Table II below and are expressed in the following way:

TABLE II

| Binders | S | R |
| --- | --- | --- |
| FEP | – – | – – |
| PTFE | – | – |
| PE | – | – |
| PA | + | +/– |
| SEBS | ++ | ++ |
| SBVR | ++ | ++ |
| Carboxylated SBR | ++ | ++ |
| 60% by weight of SBVR + 40% by weight of PTFE | + | ++ |
| 50% by weight of carboxylated SBR + 50% by weight of PTFE | +– | ++ |
| 40% by weight of carboxylated SEBS + 60% by weight of PE | ++ | – |
| 40% by weight of carboxylated SBR + 60% by weight of PE | ++ | – |
| 40% by weight of carboxylated SEBS + 60% by weight of FEP | ++ | +– |
| 40% by weight of carboxylated SBR + 60% by weight of FEP | ++ | +– |
| 50% by weight of carboxylated SBR + 50% by weight of FEP | ++ | + |
| 60% by weight of carboxylated SBR + 40% by weight of FEP | ++ | + |

++ very good mechanical strength (no crumbling or cracking)
+ good mechanical strength (no crumbling, but appearance of cracking)
+/– average mechanical strength (slight loss of material)
– poor mechanical strength (large loss of material)
– – no cohesion of the electrode The combination of the properties of the elastomer and of the crystalline polymer is of great interest for the use of the mixture according to the invention in an electrode: the flexibility and adhesion to the strip are provided by the elastomer and the cohesion of the electrode assembly is ensured by the crystalline polymer.

Next, Ni-MH rechargeable batteries with a capacitance of about 5 Ah were assembled, containing three negative electrodes having a hydridable alloy of $AB_5$ type as active material, a polyolefin bilayer separator and two positive electrodes which were the electrodes manufactured above, respectively.

These rechargeable batteries were subjected to charging at 0.2 lc for 5 hours, where lc is the current required to discharge the nominal capacitance of a rechargeable battery in 1 hour, followed by permanent overcharging at 0.02 lc for 96 days. The increase as a % of the content T of carbonates in the electrolyte relative to a rechargeable battery containing no binder was then measured. This parameter represented the chemical stability of the binder in the electrolyte.

TABLE III

| Binders | T |
| --- | --- |
| FEP | 2.3 |
| PTFE | 9 |
| PE | 6 |
| PA | 5 |
| Carboxylated SBR | 1.6 |
| 40% by weight of carboxylated SBR + 60% by weight of PE | 4 |
| 40% by weight of carboxylated SBR + 60% by weight of FEP | 2 |
| 50% by weight of carboxylated SBR + 50% by weight of FEP | 2 |
| 60% by weight of carboxylated SBR + 40% by weight of FEP | 2 |

These results showed that the binder according to the invention was stable in the electrolyte.

There is claimed:

1. A non-sintered nickel electrode containing a two-dimensional conductive support and a paste comprising an electrochemically active material containing nickel hydroxide and a binder which is a mixture of an elastomer and a crystalline polymer, wherein the proportion of the elastomer is in the range 25% to 60% by weight of the binder and the proportion of the crystalline polymer is in the range 40% to 75% by weight of the binder, wherein said crystalline polymer is polyethylene.

2. The electrode as claimed in claim 1, in which the binder is composed of 40% to 60% by weight of the elastomer and 40% to 60% by weight of the crystalline polymer.

3. The electrode as claimed in claim 1, in which the elastomer is crosslinkable.

4. The electrode as claimed in claim 1, in which the elastomer is
a styrene/ethylene/butylene/styrene copolymer,
a styrene/butadiene/vinylpyridine terpolymer or
a styrene/butadiene copolymer.

5. The electrode as claimed in claim 1, in which the proportion of the binder is in the range 0.7% to 3% by weight of the paste.

6. The electrode as claimed in claim 1, in which the nickel hydroxide contains at least (A) one syncrystallized hydroxide of zinc, cadmium or manganese and (B) one syncrystallized hydroxide of an element chosen from cobalt, manganese, aluminum, yttrium, calcium, strontium, zirconium or copper.

7. The electrode as claimed in claim 1, in which the paste also comprises a conductive material chosen from conductive particles, conductive fibers or mixtures thereof.

8. A non-sintered nickel electrode, containing a two-dimensional conductive support and a paste comprising an electrochemically active material containing nickel hydroxide and a binder which is a mixture of an elastomer and a crystalline polymer, wherein the proportion of the elastomer is in the range 25% to 60% by weight of the binder and the proportion of the crystalline polymer is in the range 40% to 75% by weight of the binder;
in which the paste also comprises a conductive material chosen from conductive particles, conductive fibers or mixtures thereof;
in which the conductive particles have an average size $D_1$ less than or equal to D/20, D being the average diameter of the grains of the active material.

9. The electrode as claimed in claim 7, in which the conductive particles are chosen from carbon particles, metal particles or powder of a transition metal compound.

10. A non-sintered nickel electrode containing a two-dimensional conductive support and a paste comprising an electrochemically active material containing nickel hydroxide and a binder which is a mixture of an elastomer and a crystalline polymer, wherein the proportion of the elastomer is in the range 25% to 60% by weight of the binder and the proportion of the crystalline polymer is in the range 40% to 75% by weight of the binder;
in which the paste also comprises a conductive material chosen from conductive particles conductive fibers or mixtures thereof;
in which the conductive fibers have an average transverse dimension $D_2$ less than or equal to D, D being the average diameter of the grains of the active material, and an average length $L_2$ greater than or equal to 25 times the value of $D_2$.

11. An electrode as claimed in claim 7, in which the conductive fibers are chosen from carbon fibers, metal fibers and metal-coated fibers.

12. The electrode as claimed in claim 11, in which the conductive material in the paste is 3% to 15% by weight of the active material.

13. The electrode as claimed in claim 1, in which the paste also comprises a thickener which is a cellulose compound chosen from carboxymethylcellulose, hydroxypropylmethylcellulose, hydroxypropylcellulose or hydroxyethylcellulose.

14. The electrode as claimed in claim 1, in which the two-dimensional conductive support is chosen from a flat or perforated strip, an expanded metal, a mesh or a fabric.

15. A secondary cell containing an alkaline electrolyte and a non-sintered nickel electrode as claimed in claim 1.

16. A binder which is a mixture of an elastomer and a crystalline polymer, wherein the proportion of the elastomer is in the range 25% to 60% by weight of the binder and the proportion of the crystalline polymer is in the range 40% to 75% by weight of the binder, and wherein said crystalline polymer is a fluorinated copolymer of ethylene and of propylene, polytetrafluoroethylene and hexafluoropropylene.

17. The binder of claim 16, wherein the binder is composed of 40% to 60% by weight of the elastomer and 40% to 60% by weight of the crystalline polymer.

18. The binder of claim 16, in which the elastomer is crosslinkable.

19. The binder of claim 16, in which the elastomer is
a styrene/ethylene/butylene/styrene copolymer,
a styrene/butadiene/vinylpyridine terpolymer or
a styrene/butadiene copolymer.

20. The binder of claim 19, in which the elastomer is a crosslinkable carboxylated copolymer of styrene and of butadiene.

21. A non-sintered nickel electrode containing a two-dimensional conductive support and a paste comprising an electrochemically active material containing nickel hydroxide and a binder which is a mixture of an elastomer and a crystalline polymer, wherein the proportion of the elastomer is in the range 25% to 60% by weight of the binder and the proportion of the crystalline polymer is in the range 40% to 75% by weight of the binder, wherein said paste also contains at least one other compound chosen from the group consisting of zinc, yttrium and calcium compounds.

* * * * *